United States Patent
Morfonios et al.

(10) Patent No.: US 8,782,219 B2
(45) Date of Patent: Jul. 15, 2014

(54) AUTOMATED DISCOVERY OF TEMPLATE PATTERNS BASED ON RECEIVED SERVER REQUESTS

(75) Inventors: Konstantinos Morfonios, Foster City, CA (US); Leonidas Galanis, San Jose, CA (US); Neoklis Polyzotis, Santa Cruz, CA (US); Karl Dias, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 70 days.

(21) Appl. No.: 13/475,514

(22) Filed: May 18, 2012

(65) Prior Publication Data

US 2013/0311642 A1    Nov. 21, 2013

(51) Int. Cl.
G06F 15/173    (2006.01)
G06F 15/16    (2006.01)

(52) U.S. Cl.
USPC ........... 709/224; 709/232; 709/217; 709/219; 715/730; 715/236; 715/700; 715/234; 707/777; 707/776; 707/827; 707/778; 707/779

(58) Field of Classification Search
USPC .................. 709/224, 232, 217, 219
See application file for complete search history.

(56) References Cited

U.S. PATENT DOCUMENTS

| | | | |
|---|---|---|---|
| 5,960,436 A | 9/1999 | Chang et al. | |
| 5,977,890 A * | 11/1999 | Rigoutsos et al. | 341/55 |
| 6,094,684 A | 7/2000 | Pallmann | |
| 6,253,228 B1 | 6/2001 | Ferris et al. | |
| 7,426,513 B2 * | 9/2008 | Gvily | 1/1 |
| 7,512,877 B2 * | 3/2009 | Aoki | 715/234 |
| 7,519,527 B2 | 4/2009 | Lau et al. | |
| 7,818,746 B2 | 10/2010 | Anderson | |
| 7,890,458 B2 | 2/2011 | Dias et al. | |
| 8,024,299 B2 | 9/2011 | Dias et al. | |
| 8,336,054 B2 | 12/2012 | Cherkasova et al. | |
| 8,352,240 B2 | 1/2013 | Ling et al. | |
| 8,370,386 B1 * | 2/2013 | Wang et al. | 707/778 |
| 8,442,941 B2 | 5/2013 | Yao et al. | |
| 8,510,406 B2 * | 8/2013 | Kembel et al. | 709/217 |
| 8,516,361 B2 * | 8/2013 | Tatsubori et al. | 715/235 |
| 2001/0020237 A1 | 9/2001 | Yarnall et al. | |
| 2002/0103858 A1 * | 8/2002 | Bracewell et al. | 709/203 |
| 2002/0198984 A1 | 12/2002 | Goldstein et al. | |
| 2003/0061569 A1 * | 3/2003 | Aoki | 715/517 |

(Continued)

OTHER PUBLICATIONS

Colle et al., "Oracle Database Replay," ACM, 2009 (4 pages).

(Continued)

Primary Examiner — Jude Jean Gilles
(74) Attorney, Agent, or Firm — Hickman Palermo Truong Becker Bingham Wong LLP; Anjali Behal (57) ABSTRACT

Described herein are methods for determining patterns based on requests received by a server. Based on the determined patterns, insight into the types of requests received by the server can be gained. Additionally, performance statistics and query statistics can be aggregated in a useful way. For example, performance statistics may be summarized for each determined pattern. One technique for determining patterns includes determining a sequence of template identifiers identifying templates that correspond to sub-sequences of requests in a sequence of server requests. A model may be created based on the sequence of template identifiers. Based on the model, template patterns may be determined. Template patterns may further be grouped into pattern clusters.

22 Claims, 5 Drawing Sheets

(56) References Cited

U.S. PATENT DOCUMENTS

| | | |
|---|---|---|
| 2003/0172091 A1 | 9/2003 | Norcott |
| 2004/0003266 A1 | 1/2004 | Moshir et al. |
| 2004/0015600 A1 | 1/2004 | Tiwary et al. |
| 2004/0221115 A1 | 11/2004 | Sahin et al. |
| 2005/0071838 A1 | 3/2005 | Hatasaki |
| 2005/0131879 A1 | 6/2005 | Ghosh et al. |
| 2005/0186975 A1 | 8/2005 | Yach et al. |
| 2006/0041685 A1* | 2/2006 | Bracewell et al. .......... 709/246 |
| 2006/0248116 A1 | 11/2006 | Sobel |
| 2007/0033586 A1 | 2/2007 | Hirsave et al. |
| 2007/0112549 A1 | 5/2007 | Lau et al. |
| 2007/0277108 A1* | 11/2007 | Orgill et al. .................. 715/730 |
| 2008/0022282 A1 | 1/2008 | Cherkasova et al. |
| 2008/0097960 A1 | 4/2008 | Dias et al. |
| 2008/0097961 A1 | 4/2008 | Dias et al. |
| 2008/0097995 A1 | 4/2008 | Dias et al. |
| 2008/0097996 A1 | 4/2008 | Dias et al. |
| 2008/0098003 A1 | 4/2008 | Dias et al. |
| 2009/0106321 A1 | 4/2009 | Das et al. |
| 2009/0319256 A1 | 12/2009 | Chow et al. |
| 2010/0005097 A1 | 1/2010 | Liang et al. |
| 2010/0299176 A1* | 11/2010 | Mangipudi et al. ............... 705/9 |
| 2011/0295801 A1 | 12/2011 | Dias et al. |
| 2012/0005174 A1 | 1/2012 | Vora |
| 2012/0158723 A1 | 6/2012 | Wu et al. |
| 2012/0185430 A1 | 7/2012 | Yao et al. |
| 2013/0191723 A1* | 7/2013 | Pappas et al. ................ 715/234 |
| 2014/0006358 A1 | 1/2014 | Wang et al. |

OTHER PUBLICATIONS

"Database Replay", Oracle White Paper, 2007 (19 pages).

Galanis et al., "Oracle Database Replay," ACM, 2008, pp. 1159-1170 (12 pages).

Ayan, Resat Otan. "Methodologically Upgrading a Production System". SANS Institute, InfoSec Reading Room [online] [retrieved on Dec. 16, 2008]. Retrieved from the Internet < URL: https://www2.sans.org/reading_room/whitepapers/sysadmin/1097.php > dated 2003 (15 pages).

"Big4Guy". IT Environment Instances: Test Development Patch Production. [online], [retrieved on Dec. 16, 2008]. Retrieved from the Internet < URL: http://big4guy.com/index.php/2006/09/22/it_environment_instances_test_develpmen > dated 2006 (3 pages).

Chan, J. "Creating a Testing Environment for Hotfixes and Patches". Ask the Enterprise Desktop Expert: Questions & Answers [online], [retrieved on Dec. 16, 2008]. Retrieved from the Internet < URL: http://searchenterprisedesktop.techtarget.com/expert/KnowledgebaseAnswer/0,289625,sid192_gci1123515.,00.html#> dated 2008 (3 pages).

Holcomb, J. "Virtualization in the SCADA World: Part 3—Testing", SCANApedia [online], [retrieved on Dec. 16, 2008]. Retrieved from the Internet < URL: http://www.digitalbond.com/index.php/2008/02/07/virtualization-in-the-scada-world-part-3 / >. dated 1998-2007 (3 pages).

VMware. "VMware P2V Assistant", Enterprise-class Tool for Physical to Virtual Machine Migration [online], [retrieved on Dec. 16, 2008]. Retrieved from the Internet <URL: http://www.nexstor.co.uk/prod_pdfs/VMware%20P2V%20Assistant.pdf > dated 2003 (2 pages).

Wise Solutions. Wise Package Studio 7: Professional Edition. [online], [retrieved on Dec. 16, 2008]. Retrieved from the Internet <URL: http://www.componentsource.com/products/wise-package-studio-professional/index.html > dated 2008 (2 pages).

Yujun Wang et al., "Real Application Testing with Database Relay", 2009, 6 pages.

Inderpal S. Johal, "Oracle 11g Database Relay", 2007, 38 pages.

Leonidas Galanis et al., "Oracle Database Replay", dated 2008, 12 pages.

Rajeev, "Consolidated database replay", dbaStreet, Dated May 23, 2012, 2 pages, accessed online at <http://dbastreet.com/blog/?tag=database-replay> on Nov. 5, 2013.

* cited by examiner

AUTOMATED DISCOVERY OF TEMPLATE PATTERNS BASED ON RECEIVED SERVER REQUESTS

CROSS-REFERENCE TO RELATED APPLICATIONS; BENEFIT CLAIM

This application is related to application Ser. No. 11/800,122, entitled Database Workload Capture And Replay Architecture, filed on May 3, 2007, the contents of which are incorporated by reference.

FIELD OF THE INVENTION

The present invention relates to analyzing received server requests.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Administrators of many types of servers, including web servers and database servers, have access to vast amounts of data specifying the requests that are received by the server. A captured database workload is one example of such data possessed by a database server administrator. A captured database workload file records requests received by a particular database during a particular interval of time. The requests received by the server are often automated and sent by a plurality of different application servers.

Captured database workload files are described in greater detail in application Ser. No. 11/800,122, entitled Database Workload Capture And Replay Architecture, filed on May 3, 2007, the contents of which are incorporated by reference.

Server administrators and application administrators can benefit by learning about the types of requests the server receives and the consequences of those requests. Previous approaches have not used information about the requests received by a server to determine patterns that can provide insight about the received requests and the consequences of the received requests.

BRIEF DESCRIPTION OF THE DRAWINGS

The present invention is illustrated by way of example, and not by way of limitation, in the figures of the accompany drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Described herein are methods for determining patterns based on requests received by a server. Based on the determined patterns, insight into the types of requests received by the server can be gained. Additionally, performance statistics and query statistics can be aggregated in a useful way. For example, performance statistics may be summarized for each determined pattern.

One technique for determining patterns includes determining a sequence of template identifiers, where each template identifier identifies a template corresponding to a sub-sequence of requests in a sequence of server requests ("base request sequence"). A model may be created based on the sequence of template identifiers. Based on the model, template patterns may be determined. Template patterns may further be grouped into pattern clusters.

Example Method for Determining Patterns

Figure 1:
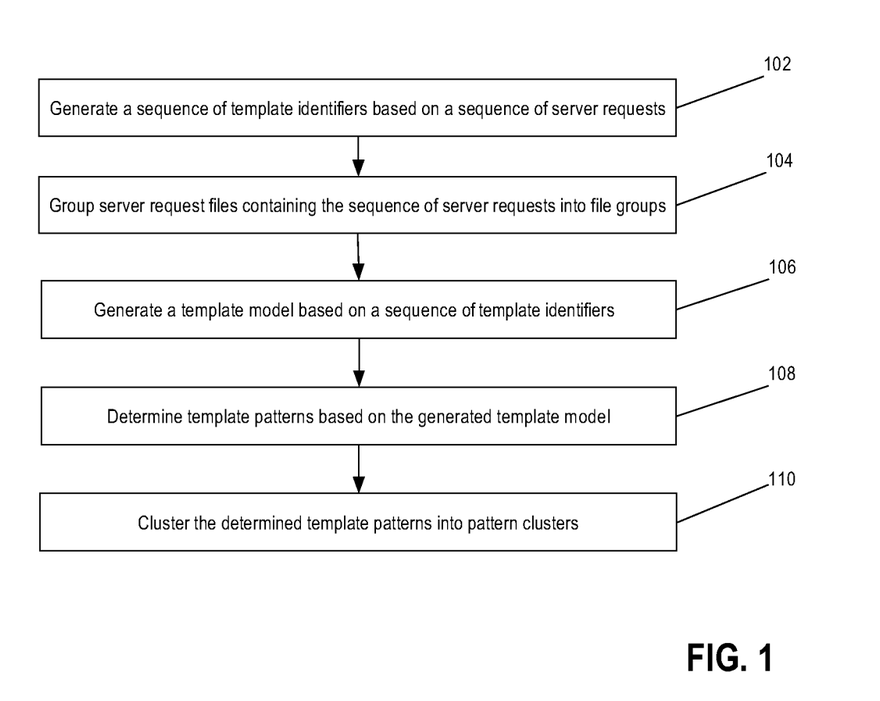
FIG. 1 is a flow diagram illustrating an example method of determining patterns based on a sequence of server requests.

FIG. 1 is a flow diagram illustrating an example method of determining patterns based on a sequence of server requests. The sequence of server requests may be the sequence of requests received by a particular server or a set of servers. Other embodiments may not include one or more of the illustrated steps and/or may include additional steps not illustrated in FIG. 1.

At block 102, a sequence of template identifiers is generated based on a sequence of server requests. At block 104, server request files containing the sequence of server requests are grouped into file groups. At block 106, a template model is generated based on a sequence of template identifiers. At block 108, template patterns are determined based on the generated template model. At block 110, the determined patterns are clustered into pattern clusters. Each of the steps illustrated in FIG. 1 is described in greater detail below.

Server Request Sequence

The base request sequence upon which a determination of patterns is based may comprise requests received by a particular server, or in an embodiment, a set of servers. The requests may comprise statements, queries, arguments, or form inputs entered into the fields of a form. In an embodiment, the server requests in the base request sequence are requests received by a database server. For example, the server requests may be SQL statements or queries submitted to a database server. In another embodiment the sequence of server requests is a sequence of server requests received by a web server, such as HTTP requests. The base request sequence may comprise the sequence of server requests received by a server within a particular time interval, and the requests may be ordered in chronological order. In an embodiment, the sequence of server requests is contained in database capture files generated according to method described in application Ser. No. 11/800,122, entitled Database Workload Capture And Replay Architecture.

Determining Templates

In an embodiment, a sequence of template identifiers where each template identifier corresponds to a sub-sequence of requests in a base sequence of server requests may be determined. As illustrated at block 102 of FIG. 1, a sequence of template identifiers is generated based on a base sequence of server requests, where each template identifier identifies a single template and each template is identified by a single template identifier.

Sub-sequences of server requests ("request sequences") in the base request sequence are mapped to templates. A request sequence is a sequence of server requests that is a sub-sequence of the base request sequence.

In an embodiment, each request in the sequence of server requests is a part of one and only one request sequence that is mapped to a particular template. The sequence of template identifiers may be generated by replacing each request sequence in the base sequence of requests with a template identifier identifying the template that corresponds to the replaced request sequence. For example, the sequence of template identifiers may be generated by considering each request sequence in the base sequence of server requests, determining the corresponding template of the request sequence based on the considered request sequence, and replacing the considered request sequence with the determined corresponding template.

Some sequences of requests may be a single request. Other sequences of requests may comprise multiple requests. For example, a sequence of server requests may be as follows:

$R_1 R_2 R_3 R_4 R_5$

The request sequence that is $R_1 R_2 R_3$ may correspond to the template identified by T1, the request sequence that is $R_4$ may correspond to the template identified by $T_2$ and the request sequence that is $R_5$ may correspond to the template identified by $T_3$. Thus, the sequence of template identifiers generated based on the sequence of server requests $R_1 R_2 R_3 R_4 R$ would be $T_1 T_2 T_3$.

There may be a one-to-many mapping between request sequences and templates, where each request sequence corresponds to a single template and multiple different request sequences correspond to the same template. In an embodiment, the template that corresponds to a request sequence is determined by entering some text representing the request sequence into a hash function. The hash value returned by the hash function represents the request sequence's corresponding template. The text entered into the hash function may be the text of the requests that comprise the request sequence, as sent by a client of the server, with some characters removed. The characters removed may be space characters, comments, or request parameters such as, for example, variable names, object names, list values, query predicates, or bind values.

For example, a request sequence (including a single server request) may be as follows:

Request sequence 1:
select Name
from PersonTable
where Age=30

The text that represents the above server request may be created by removing column names, comparison operators, literal values, and/or superfluous spaces from the text of the above request. Thus, the above server request may be represented by the following text:

selectfromPersonTablewhere

The representative text "selectfromPersonTablewhere" may be entered into a hash function. The hash function may return the hash value "S." Thus, the above request sequence comprising one server request would be mapped to the template identified by template identifier of S.

Continuing with the example, other sequences of requests may correspond to the same template S. For example, there may be a second request sequence as follows:

Request sequence 2:
select Height, Name
from PersonTable
where Gender=F

Request sequence 2 may be represented by the following text:

selectfromPersonTablewhere

The representative text for Request sequence 2 may be entered into the same hash function, and the hash function would return the same value "S." Thus, Request sequence 2 would correspond to the same template identified by the template identifier of S.

Templates may be associated with template definitions that describe attributes of a server request. Each request sequence that corresponds to a particular template possesses the attributes described by the template definition associated with the particular template.

For example, a template definition associated with a particular template may describe that all sequences corresponding to the template must include a single query and the query must retrieve a value from a particular column of a particular table. Each request sequence corresponding to the particular template would possess the attributes described by the template definition. That is, each request sequence corresponding to the particular template would include only a single query that accesses a value from the particular column of the particular table.

As another example, another template definition associated with another particular template may describe a sequence including two requests, the first request being a request to retrieve a forgotten password, and the second request being a request to log into an account. Thus, each request sequence associated with the particular template would include two requests—a request to retrieve a password, immediately followed by a request to log into an account.

In an embodiment, statistics are determined on a per-template basis. That is, performance data may be summarized for all request sequences that correspond to a particular template. For example, it may be determined that 30 percent of the requests received by a server are a part of a request sequence that corresponds to a particular template. Another statistic may include performance data. For example, it may be determined that, on average, a particular amount of time elapses during the execution of request sequences corresponding to a particular template.

Grouping Server Request Files

All of the requests of the sequence of server requests may be included in a single file or the requests may span multiple files. In an embodiment, the sequence of requests may include requests sent to the server from a plurality of different applications. The sequence of requests may span multiple files, and each file may include server requests sent from the same application.

In an embodiment where the sequence of server requests spans multiple files, the multiple files may be grouped into file groups. This step is illustrated as block 104 of FIG. 1. That is, each file of the multiple files is assigned to one and only one file group, and each file group is associated with one or more files. The result of the grouping is that each file associated with a particular file group includes server requests that are determined as being sent from the same application. A file is assigned to a file group in response to determining that the file includes server requests sent from the same application as the server requests included in other files of the group. This determination may include comparing the sequence of template identifiers corresponding to the server requests of one file to the sequence of template identifiers corresponding to the server requests of another file. One file may be the file whose group assignment is being determined and the other file may be a file that has already been assigned to a file group.

For example, a determination that more than 90 percent of the template identifiers corresponding to the sequence of server requests included in a particular file appear in the set of template identifiers corresponding to the sequence of server requests included in another file may indicate that the requests included in the two files were likely sent by the same application. Thus, a file may be assigned to a particular file group in response to determining that at least 90 percent of the template identifiers corresponding to the sequence of server requests included in the file appear in the set of template identifiers corresponding to the sequence of server requests included in another file of the particular file group. In other embodiments, the determination to assign a file to a file group may occur in response to determining that the percentage of template identifiers shared by the two sets of template identifiers is greater than some other predetermined threshold amount.

Modeling Request Templates

As illustrated at block 106 of FIG. 1, in an embodiment, a template model is generated based on a sequence of template identifiers. In an embodiment, a template model is associated with a particular file group. The file group-associated template model is generated based on a sub-sequence of the sequence of template identifiers. The sub-sequence of template identifiers upon which the template model is based includes only the template identifiers which were determined based on request sequences contained in files associated with the particular file group.

To illustrate an example of a model generated based on a sequence of server requests spanning two files, consider the sequence of server requests R1, R2, R3, R4, R5, R6 ("Request Sequence 1"). Requests R1, R2, and R3 are contained in File 1, associated with File Group 1, and requests R4, R5, and R6 are contained in File 2, associated with File Group 2. The sequence of template identifiers generated based on Request Sequence 1 is T1, T2, T3, T1, T4, T5. If a template model is associated only with File Group 1, the model would be generated based only on the sequence of template identifiers T1, T2, T3 ("Sub-sequence 1"), because each of the template identifiers of Sub-sequence 1 was determined based on requests contained in a file associated with File Group 1. The model would not be generated based upon T1, T4, T5 ("Sub-sequence 2"), because each of the template identifiers of Sub-sequence 2 was determined based on requests contained in a file that is not associated with File Group 1.

The template model comprises a plurality of probability values. The probability values are calculated based on a sequence of template identifiers. The probability values may be calculated based on the generated sequence of template identifiers or a sub-sequence of the generated sequence of template identifiers (for example, if the template model being created is to be associated with a particular file group, as described above.)

Each probability value of the model is associated with a leading sequence and a template identifier. The probability value indicates a probability with which the template identifier will immediately follow the leading sequence. A leading sequence is a sequence of template identifiers. The probability value may be calculated by determining the number of times the leading sequence is immediately followed by the template identifier in the sequence of template identifiers upon which the model is based and the number of times the leading sequence is immediately followed by some other template identifier in the same sequence of template identifiers. For example, a probability value may be associated with a template identifier X, and a leading sequence AB. The probability value may be calculated by, first, determining the total number of times the sequence AB appears in the sequence of template identifiers and, second, determining the total number of times the template identifier X immediately follows sequence AB in the sequence of template identifiers. The probability value may be calculated by dividing the second number by the first number. The probability value would indicate the fraction of times the template identifier X immediately follows the sequence AB out of the total number of times the sequence AB appears in the sequence of template identifiers.

The template model is of a particular order, and the maximum length of a leading sequence associated with a probability value of the template model is based on the order of the template model. The greater the order of the model, the greater the length of the leading sequences associated with the probability values of the model. In an embodiment, the maximum length of the leading sequences associated with the probability values of a model is equal to the order of the template model. For example, if the template model is of order two, each probability value of the model indicates the probability that a particular template follows a sequence of at most two templates.

Figure 2:
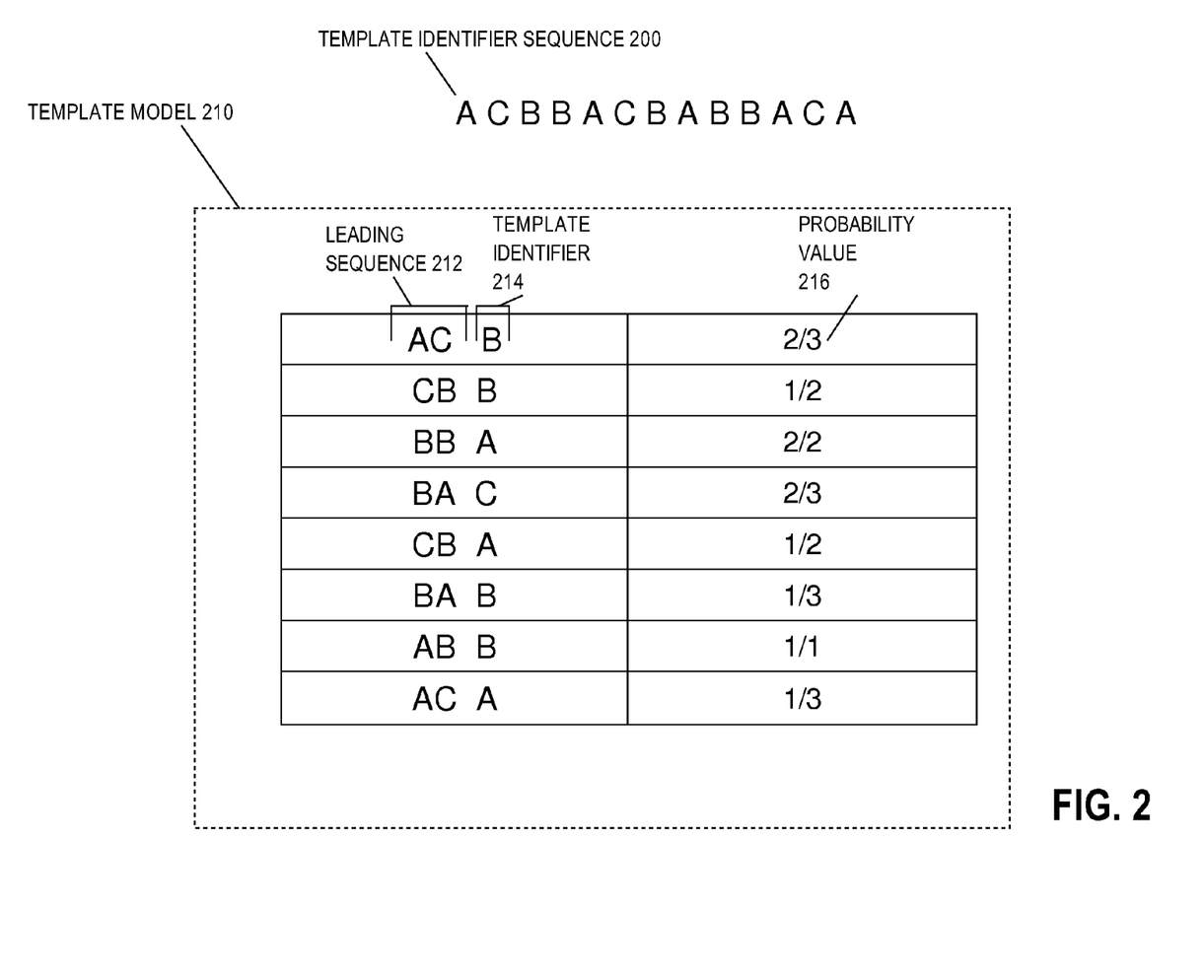
FIG. 2 illustrates an example template identifier sequence and an example template model.

FIG. 2 illustrates an example template identifier sequence and an example template model. The example template model is generated based on the example template identifier sequence. Template identifier sequence 200 is a sequence of template identifiers. Model 210 is a template model created based on template identifier sequence 200. Model 210 includes a set of probability values calculated based on template identifier sequence 200. Each probability value indicates the fraction of times the associated leading sequence was immediately followed by the associated template identifier in template identifier sequence 200. For example, probability value 216 is associated with leading sequence 212 and template identifier 214. Probability value 216 is calculated by dividing the number of times the template identifier sequence ACB appears in template identifier sequence 200 by the number of times the leading sequence AC appears in template identifier sequence 200. The sequence ACB appears twice, and the sequence AC appears three times, thus probability value 216 is ⅔.

The illustrated model is a model of order two. Thus, the leading sequences for which probability values are calculated are associated with a leading sequence of at most two template identifiers. For example, leading sequence 212 is a template identifier sequence of length two—template identifier A, immediately followed by template identifier C.

Selecting a Model Order

In an embodiment, multiple models are generated based upon the same sequence of template identifiers, with each model having a different order. The multiple models are test models generated for the purpose of determining an optimal model order for modeling the templates. The term optimal model order refers herein to the model order which is chosen as a best order out of one or more orders for which test models have been generated and analyzed. In an embodiment, based on the plurality of generated test models, one order is chosen as an optimal order for modeling the sequence of templates ("the selected order"). A particular model order may be chosen to be the selected order for modeling the sequence of templates based on values calculated for one or more of the generated models. In an embodiment, a model size value and an encoding size value is calculated for each of the plurality of generated models. A model size value indicates the size of the particular generated model. In an embodiment, the model size value is calculated based on the amount of probability values that are included in a particular generated model. Generally, the larger the order of a template model, the greater the number of probability values that are needed to represent the sequence of template identifiers. Thus, a template model of order 40 is likely to have a greater model size value than a template model of order 2.

The encoding size value assigned to a model may be calculated based on the sequence of template identifiers upon which the model was based and the probability values of the generated model. In an embodiment, the encoding size value is calculated by considering each template identifier of the sequence of template identifiers, and determining the probability value corresponding to the template identifier. As described above, each probability value is associated with a template identifier and a leading sequence. For each particular template identifier of the sequence of template identifiers, the corresponding probability value is the probability value associated with the template identifier and a leading sequence that includes the template identifiers immediately preceding the template identifier. For example, consider the sequence of template identifiers T1, T2, T3, T4. In an embodiment, the probability value corresponding to the fourth template identifier is the probability value associated with template identifier T4 and associated leading sequence T1, T2, T3.

As described above, probability values of a particular model are associated with leading sequences of length no greater than the order of the model being generated. Thus, the corresponding probability value of the particular template identifier is associated with a leading sequence that includes all of the template identifiers that precede the template identifier, unless the template identifier is preceded by an amount of template identifiers that is greater than the order of the generated model. In such a case, the corresponding probability value's associated leading sequence includes a certain number of template identifiers that immediately precede the particular template identifier, and that certain number is the order of the model. All template identifiers occurring before the certain number of template identifiers that immediately precede the template identifier being considered are ignored.

After each of the probability values are determined, an encoding size value is determined based on the determined probability values. In an embodiment, the encoding size value is the log of the product of the probability value associated with each template identifier of the sequence of template identifiers. The encoding size value may be an indicator of how much space is required to model the sequence of template identifiers.

Figure 3:
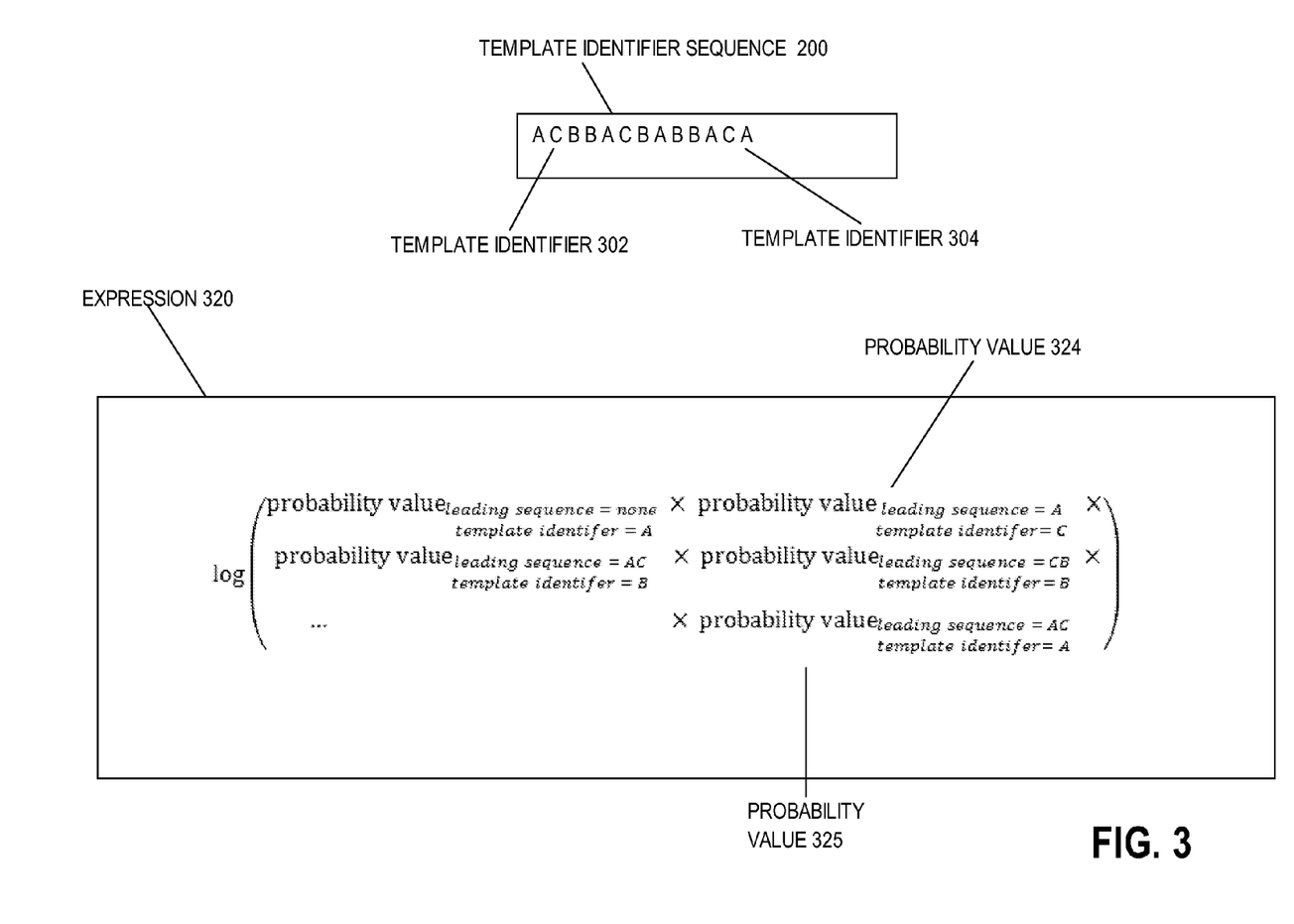
FIG. 3 illustrates an example expression that can be computed to determine the encoding size value of a template identifier sequence in an embodiment.

FIG. 3 illustrates an example expression that can be computed to determine the encoding size value of a base template identifier sequence in an embodiment. Template identifier sequence 200 is a sequence of template identifiers. The sequence of template identifiers is comprised of template identifier A, immediately followed by template identifier C, which is immediately followed by template identifier B, etc. Expression 320 is an expression for calculating the encoding size value of template identifier sequence 200.

A probability value is calculated for each template identifier in the template identifier sequence. For example, probability value 324 is the probability value associated with template identifier 302. Since template identifier 302 is preceded by the template identifier sequence A, the probability value 324 is associated with a template identifier C, and a leading sequence A. The length of the leading sequence is limited by the order of the model upon which the determination of the probability values is based. In the illustrated example, the illustrated encoding size value is for a model of order two. Thus, each probability value in expression 320 is associated with a leading sequence of maximum length two.

For example, probability value 325 is the probability value determined based on template identifier 304. Even though template identifier 304 is preceded by more than two template identifiers, probability value 325 determines the probability value with a leading sequence that includes only the two template identifiers that immediately precede template identifier 304. Thus, probability value 325 is associated with a leading sequence of AC.

Finally, the encoding size value is calculated by determining the log of the product of each determined probability value.

Each generated model may be assigned a fit value that is a function of the size value and the encoding size value of the generated model. For example, the fit value may be the sum of the size value and the encoding size value. After a plurality of models are generated, each having a different order, a particular model order may be selected based on the fit value associated with each of a plurality of different models.

A model order may be selected by comparing the fit values of a plurality of generated models. In an embodiment, a model order is selected by determining if a model of the plurality of generated models has a fit value that is a local minimum. A fit value of a particular model is a first local minimum if all of the models having an order value lower than the order of the particular model have a corresponding fit value that is greater than the fit value of the particular model and the model having an order value one greater than the particular model has a fit value that is also greater than the fit value of the particular model.

For example, the following is a table of fit values associated with six different models, each model being of a different order:

| | Fit Value Table | | | | | |
| --- | --- | --- | --- | --- | --- | --- |
| | Model | | | | | |
| | A | B | C | D | E | F |
| Order of model | 0 | 1 | 2 | 3 | 4 | 5 |
| Fit value | 50 | 43 | 41 | 35 | 37 | 35 |

If the models are considered in order of the models' orders, model D would be the first model with a fit value that is a local minimum. That is because Model D is the first model of Models A-D that has a fit value that: (1) is lower than the fit values of all models with a lower order, i.e. Models A-C, and (2) is lower than the fit value of the model with the next greatest order, i.e. Model E. Thus, according to an embodiment, the order of Model D—order 3—would be chosen as the selected model order for modeling the data for which the Fit Value Table was created. In an embodiment, the model upon which the determination of template patterns is based may be of the order chosen to be the selected order.

Determining Template Patterns

As illustrated at block 108 of FIG. 1, in an embodiment, template patterns are determined based on the generated template model. A template pattern is a sequence of one or more template identifiers that are included in another sequence of template identifiers ("base template identifier sequence"). The base template identifier sequence may be the sequence of template identifiers determined according to techniques described above. In an embodiment, multiple template patterns are determined based on a sequence of template identifiers where each template identifier of the base template identifier sequence is a part of one and only one template pattern of the multiple template patterns. Each template pattern is a sequence of template identifiers, the template pattern being a sub-sequence of the base template identifier sequence. The ordering of the template identifiers in the determined template pattern corresponds to the ordering of the same template identifiers in the base template identifier sequence.

For example a base template identifier sequence could be as follows:

$T_1 \ T_2 \ T_3 \ T_4 \ T_5 \ T_6 \ T_7 \ T_8$

As an example, the determination of template patterns may result in the base template identifier sequence being split up into multiple template patterns as follows:

$T_1 \ T_2 \ T_3 \ T_4 \ T_5 \ T_6 \ T_7 \ T_8$

As shown above, the sequence of $T_1 \ T_2 \ T_3$ is one pattern, the sequence of $T_4 \ T_5$, is another pattern, $T_6$ is yet another pattern, and the sequence of $T_7 T_8$ is another pattern. Each determined template pattern is a sequence of template identifiers that appears in the base template identifier sequence.

Figure 4:
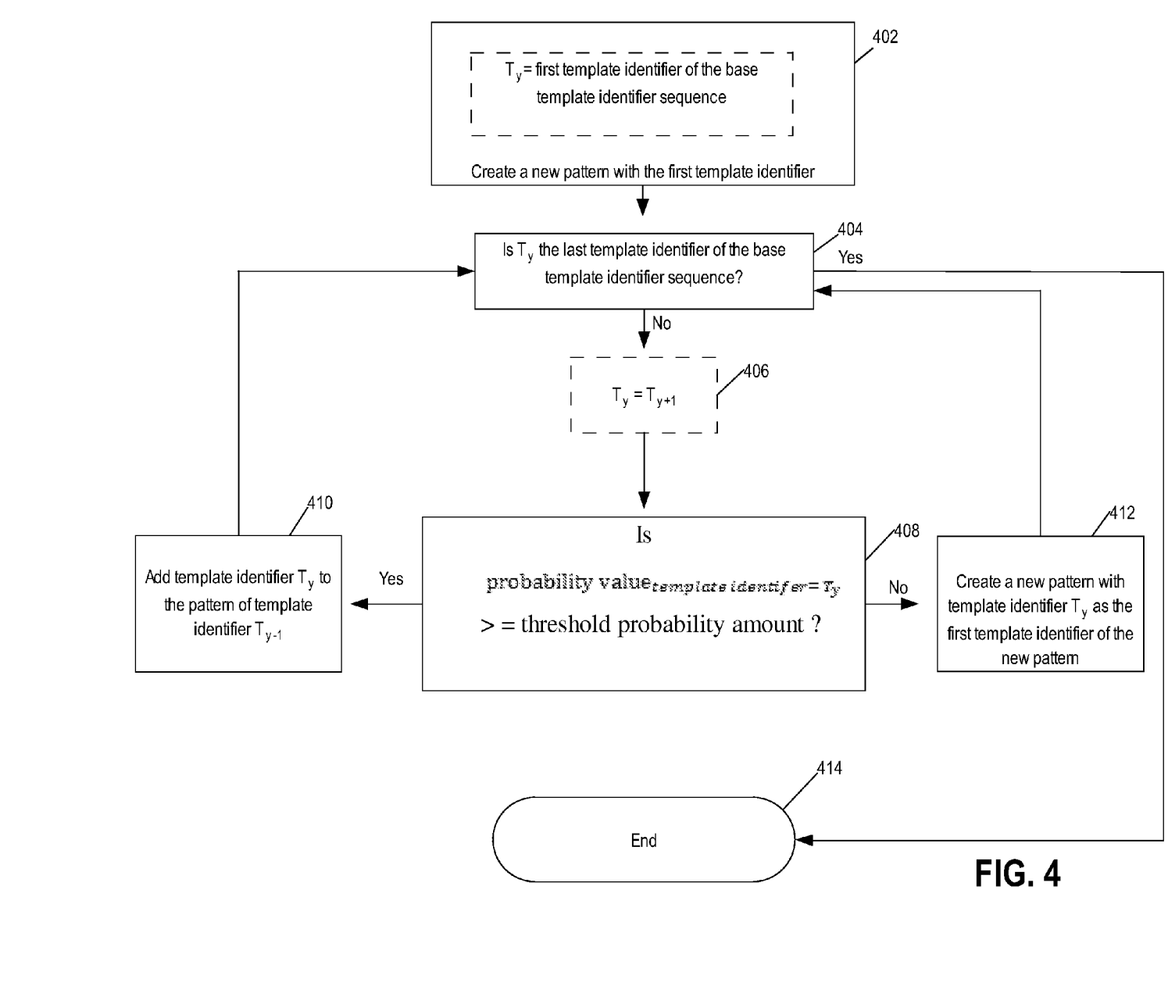
FIG. 4 is a flow diagram illustrating one method of determining patterns.

FIG. 4 is a flow diagram illustrating, in part, one method of determining patterns. The illustrated method determines patterns based on a base template identifier sequence and a template model. The base template identifier sequence may be the template identifier sequence generated based on the sequence of server requests. In an embodiment, the template model upon which the determination of patterns is based is of an order that has been determined to be an optimal model order according to the technique described above.

Each template identifier of the base template identifier sequence is considered one by one. For each template identifier, it is determined if the template identifier should be added to a pattern or whether a new pattern should be created with the template identifier being considered. Adding a template identifier to a pattern refers to modifying an existing pattern by adding a template identifier to the end of the pattern. The template identifiers are each considered according to the ordering of the template identifiers in the base template identifier sequence. In an alternate embodiment, for one or more template identifiers that are considered, the template identifier is not added to any pattern.

At block 402, a new pattern is created and the first template identifier of the newly created pattern is the first template identifier of the base template identifier sequence. Next, at block 404, it is determined if the template identifier being considered is the last template identifier in the base template identifier sequence. If it is, the process ends at block 414. Otherwise, as shown in block 406 the method iterates to the next template identifier in the base template identifier sequence, which is the second template identifier in the base template identifier sequence, and the second template identifier is considered. At block 408, a probability value corresponding to the second template identifier is determined and that probability value is compared to a predetermined threshold probability amount. The corresponding probability value is associated with the second template identifier and the associated leading sequence which includes only the first template identifier. Thus, the probability value indicates the proportion of times the first template identifier is immediately followed by the second template identifier in the base sequence of template identifiers.

If the probability value is greater than or equal to a threshold amount, the step of block 410 is performed. That is, the second template identifier of the base template identifier sequence is added to the same pattern as the first template identifier of the base template identifier sequence. The second template identifier is added by modifying the pattern to which the first template identifier of the base template identifier sequence belongs so that the second template identifier is added as the last template identifier of the modified pattern. If the probability value is less than a threshold amount, the step of block 412 is performed. That is, a new pattern is created and the second template identifier is the first template identifier of the newly created pattern.

The predetermined probability threshold amount affects how large the determined patterns are. If the predetermined probability threshold amount is high, it is more likely that a corresponding probability value being considered will be determined to be less than the predetermined threshold amount. This determination causes a new pattern to be formed rather than the considered template identifier being added to an existing pattern. Thus, a large probability threshold amount tends to cause a greater number of small patterns to be formed rather than a small number of large patterns.

Continuing with the discussion of FIG. 4, next, at block 404 it is determined if the template identifier being considered is the last template identifier in the base template identifier sequence. If it is, the process ends at block 414. Otherwise, as shown in block 406, the method iterates to the next template identifier in the base template identifier sequence, and the next template identifier is considered. As shown in block 408, the probability value corresponding to the next template identifier is determined. The process continues to repeat until there are no more template identifiers left to be considered.

The corresponding probability value considered at block 408 is the probability value associated with a leading sequence including the sequence of template identifiers that immediately precede the template identifier being considered in the base template identifier sequence. As discussed earlier, in an embodiment, the maximum length of a leading sequence is the same as the order of the associated model. If the number of template identifiers that precede the template identifier being considered is greater than the order of the model upon which the determination of template patterns is based, the leading sequence associated with the corresponding probability value includes a particular number of template identifiers that precede the template identifier being considered. The particular number of template identifiers is the order of the model upon which the determination of template patterns is based. All template identifiers occurring before the particular number of template identifiers that immediately precede the template identifier being considered are ignored.

The determination of a pattern likely indicates that there exists a corresponding codepath in a client application that sends requests to the server. A codepath is a portion of code executed by the client application that causes a particular sequence of requests to be sent to a server. For example, consider a template pattern that constitutes the following sequence of template identifiers: $T_1 \ T_2 \ T_3$. All requests that update the Address column of a Customer table may correspond to the template identified by $T_1$. All requests that update the Pending Orders column of a Customer table may correspond to the template identified by $T_2$. All requests that retrieve a value from a Confirmation Codes table may correspond to the template identified by $T_3$.

The fact that a request sequence corresponding to template $T_3$ has immediately followed a request sequence corresponding to template $T_2$ and a request sequence corresponding to template $T_1$ often enough to trigger the labeling of template identifiers $T_1 \ T_2 \ T_3$ as a pattern indicates that the request sequences were likely generated by a particular piece of application code, i.e. a codepath, that automatically generates such requests in response to the occurrence of an event in the program. For example, the codepath that corresponds to the template pattern $T_1 \ T_2 \ T_3$ described above may be some code that is executed by an online shopping website in response to a customer selecting a link to "Confirm order." The code, when executed, may cause a particular sequence of requests to be sent to the database server. The particular sequence of requests may cause (1) a particular customer's address to replace the value stored in the Address column of a Customer table, (2) a particular order number to replace the value stored in the Pending Orders column of a Customer table, and (3) a particular confirmation code to be retrieved from a Confirmation Codes Table.

In an embodiment, statistics are determined on a per-pattern basis. In this application, a sequence of request sequences is referred to as corresponding to a particular template pattern if replacing each request sequence by the template identifier that identifies the template that corresponds to the request sequence results in a sequence of template identifiers that constitute the particular pattern. There may be a determined statistic indicating that 40 percent of the time elapsed during the execution of a particular sequence of server requests was spent during the execution of a sequence of request sequences that corresponds to a particular pattern. This may indicate that the particular pattern is very time-intensive to perform.

Such information may be used by a database administrator for database optimizations. For example, a database administrator may perform an optimization that results in reducing the time required to execute the sequence of request sequences that correspond to the time-intensive template pattern.

Information may also be provided to the designer of an application from which a sequence of request sequences originates. For example, the information provided to the application designer may include an example sequence of request sequences sent by the application that corresponds to the particular time-intensive pattern and indicate that such a sequence of request sequences is highly time-intensive. As a result of such information, application designers may modify the code executed by their applications so that the modified requests sent by the application code are less time-intensive.

Detecting Pattern Loops

Template patterns may be comprised of template loops. A loop is a sequence of template identifiers that appears in a particular template pattern, where the sequence is (1) a single template identifier repeating multiple times consecutively or (2) a sub-sequence of template identifiers repeating multiple times consecutively. The loop length of a particular template loop indicates the number of times the particular sequence of template identifiers occurs consecutively more than once in a particular template pattern. For example, the pattern ABBBC is comprised of a "B" loop of length 3, because the template identifier B is a single template identifier repeating consecutively three times in the template pattern.

In an embodiment, multiple patterns of the determined set of patterns are grouped into one loop group. Each pattern belonging to a particular loop group is comprised of the same sequence of loops and in the same order. The difference among the patterns of a particular loop group is that the loops may be of varying lengths for each of the patterns in the loop group. For example, each of the following template patterns may be grouped into one loop group:
Pattern 1: AAABBCCC
Pattern 2: AABBBBBCC
Pattern 3: AABBBCCCCC Each of the above template patterns may be grouped into one loop group, because each of the above patterns includes the same sequence of loops—an "A" loop is immediately followed by a "B" loop, which is immediately followed by a "C" loop. The three patterns are grouped into the same loop group despite, for example, the "A" loop being of length three in pattern 1, and of length two in patterns 2 and 3.

As another example, each of the following template patterns may be grouped into another loop group.
Pattern 4: ABABABCD
Pattern 5: ABABCD
Pattern 6: ABABABABABABCD Each of the above template patterns may be grouped into one loop group, because each of the above patterns includes the same sequence of loops—an "AB" loop is immediately followed by template identifier "C," which is immediately followed by template identifier "D."

The three patterns are grouped into the same loop group despite, for example, the "AB" loop being of length three in pattern 1, of length two in pattern 2, and length six in pattern 3.

In an embodiment, statistics are determined on a per-loop group basis. That is, performance data may be summarized for all request sequences that correspond to a template pattern that belongs to a particular loop group. For example, it may be determined that some percentage of the requests received by a server correspond to a template pattern that belongs to a particular loop group. Another statistic may include performance data. For example, it may be determined that, on average, a particular amount of time elapses during the execution of requests corresponding to a template pattern that belongs to a particular loop group.

Pattern Clustering

As shown in block 110 of FIG. 1, in an embodiment, the determined patterns are clustered into pattern clusters, i.e. groups of patterns. In an embodiment, each determined pattern is assigned to a single cluster, and each cluster is associated with one or more patterns. If loop groups have been determined, each pattern of a particular loop group is assigned to a single pattern cluster.

A pattern may be assigned to a pattern cluster in response to a determination that the pattern being assigned is similar in some way to other patterns associated with the pattern cluster. The methods of measuring whether two patterns are similar may vary according to different embodiments. Two patterns may be determined to be similar based on a comparison of the characteristics of the templates that correspond to the identifiers that are included in the two patterns. This may include comparing the template definitions associated with the templates identified by a first pattern to the template definitions associated with the templates identified by a second pattern. As another example, two patterns may be determined to be similar based on a comparison of the server requests corresponding to the templates identified by one pattern to the server requests corresponding to the templates identified by another pattern. The server request(s) corresponding to a template identifier refer to the server request(s) that map to the template identified by the template identifier. For example, a pattern clustering rule may indicate that if a request corresponding to a template identifier of a pattern accesses the same table as a request corresponding to a template identifier of a second pattern, the two patterns should belong to the same pattern cluster.

In an embodiment, a pair of patterns may be assigned a similarity value indicating how similar the templates identified by the identifiers included in one pattern are to the templates identified by the identifiers included in another pattern based on some metric of similarity. A clustering rule may indicate that any two patterns that have a similarity value that is greater than a predetermined threshold similarity value should be assigned to the same cluster. The particular metric of similarity used to determine the similarity value can vary according to different embodiments.

In an embodiment, the determination of the sequence of template identifiers is based upon requests sent by a client application to the server. In such an embodiment, pattern clusters may represent different applications, or different parts of the same application. For example, the methods of pattern clustering described above may cause pattern clustering such that one cluster is associated with patterns that include template identifiers corresponding to requests that access mostly the same set of tables, and another cluster is associated with patterns whose template identifiers correspond to requests that also access mostly a different set of same tables. With such an outcome, it is likely that the requests corresponding to the identifiers of the first pattern cluster originate from the same application or application portion and the requests corresponding to the identifiers of the second pattern cluster originate from a same application or application portion that is different form the application or application portion of the first pattern cluster.

Statistics may be provided on a per pattern cluster basis. That is, performance data may be summarized for all request sequences that correspond to a template pattern that belongs to a particular pattern cluster. For example, it may be determined that some percentage of the requests received by a server correspond to a template pattern that belongs to a particular pattern cluster. Another statistic may include performance data. For example, it may be determined that, on average, a particular amount of time elapses during the execution of requests corresponding to a template pattern that belongs to a particular pattern cluster.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
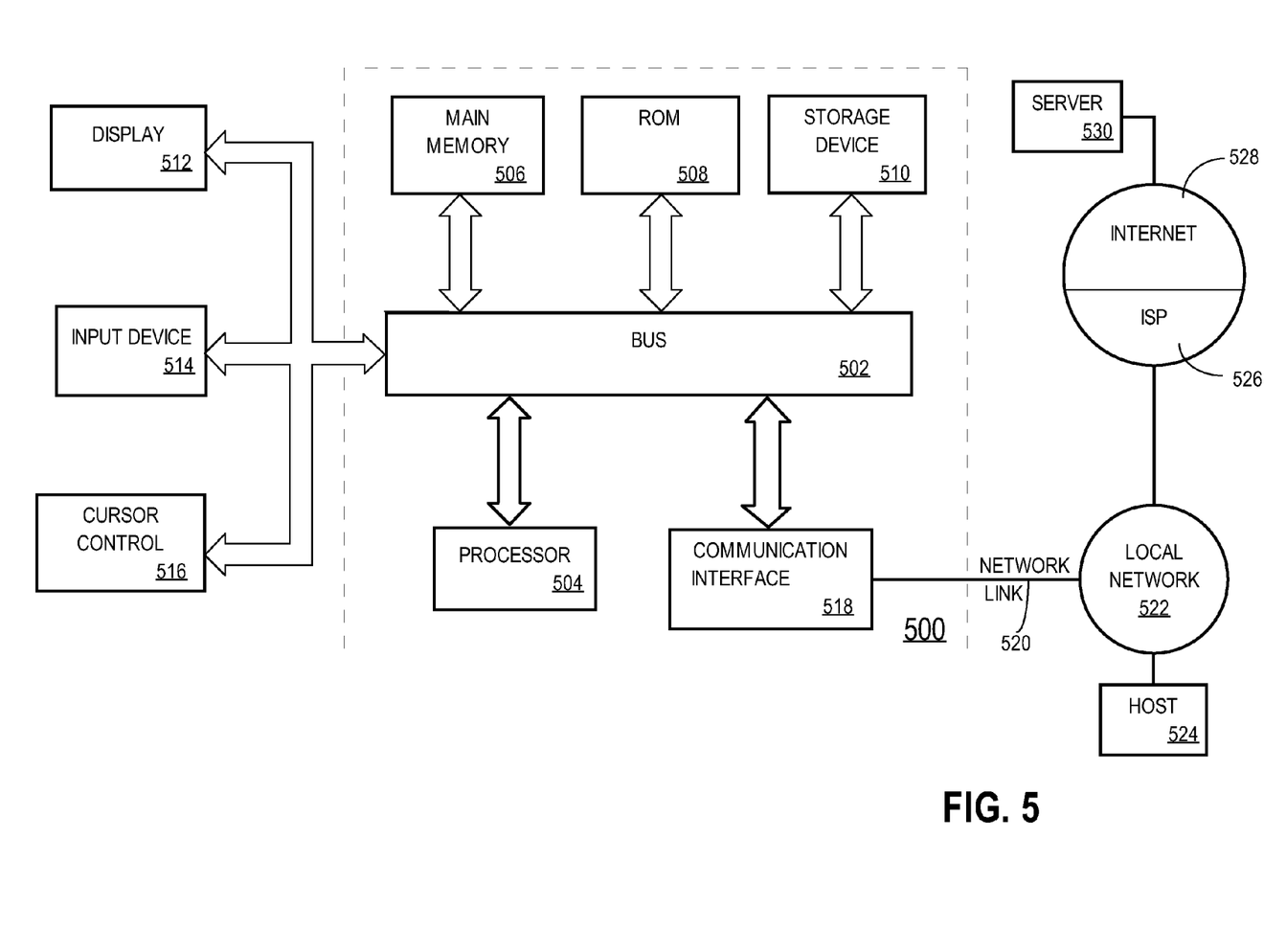
FIG. 5 is a block diagram that illustrates a computer system upon which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for determining patterns of templates comprising steps of:
    based on a sequence of server requests, determining a sequence of templates, wherein each template of said sequence of templates corresponds to one or more respective server request sub-sequences in the sequence of server requests, wherein the sequence of templates has an order corresponding to the order of the sequence of server requests;
    wherein each template in the sequence of templates is associated with one or more attributes, wherein each of the one or more respective server request sub-sequences corresponding to said each template possess the one or more attributes;
    based in part on the sequence of templates, determining template patterns, wherein each template pattern of the template patterns is defined by a respective defining sub-sequence of templates of said sequence of templates; and
    wherein the steps are performed by one or more computing devices.

2. The method of claim 1, wherein for each particular template in the sequence of templates, each of the respective server request sub-sequences corresponding to the particular template include no more than one request.

3. The method of claim 1, wherein the sequence of server requests comprise a sequence of server requests sent to a database server within a particular time interval.

4. The method of claim 1, wherein determining template patterns comprises:
    determining a model based on a sub-sequence of the sequence of templates, the model including a plurality of probability values, wherein each probability value is associated with a particular template of the sequence of templates, and each probability value indicates a probability with which an associated template follows a respective leading sequence of templates.

5. The method of claim 4, wherein the sub-sequence of the sequence of templates is the entire sequence of templates.

6. The method of claim 4, wherein each template of the sub-sequence of the sequence of templates corresponds to a respective server request sequence included in a file associated with a particular file group.

7. The method of claim 4, wherein determining template patterns further comprises:
    based on a particular probability value associated with a particular template, adding the particular template to a template pattern.

8. The method of claim 4, wherein determining template patterns further comprises:
    based on a particular probability value associated with a particular template, beginning a new template pattern that includes the particular template.

9. The method of claim 4, wherein each of the respective leading sequences of templates that correspond to the plurality of probability values include at most a particular number of templates and the particular number is less than or equal to an order of the model.

10. The method of claim 9, further comprising selecting the order of the model based on a plurality of test models, each test model of the plurality of test models modeling the sub-sequence of the sequence of templates and each test model of the plurality of test models being of a different order.

11. The method of claim 1, further comprising:
    assigning one or more particular template patterns of the template patterns to a particular pattern cluster, wherein each template pattern assigned to the particular pattern cluster is determined to be sufficiently similar to another respective template pattern assigned to the particular pattern cluster.

12. A non-transitory computer-readable medium storing instructions which, when executed by one or more processors, cause:
    based on a sequence of server requests, determining a sequence of templates, wherein each template of said sequence of templates corresponds to one or more respective server request sub-sequences in the sequence of server requests, wherein the sequence of templates has an order corresponding to the order of the sequence of server requests;

wherein each template in the sequence of templates is associated with one or more attributes, wherein each of the one or more respective server request sub-sequences corresponding to said each template possess the one or more attributes;

based in part on the sequence of templates, determining template patterns, wherein each template pattern of the template patterns is defined by a respective defining sub-sequence of templates in said sequence of templates.

13. The non-transitory computer-readable medium of claim 12, wherein for each particular template in the sequence of templates, each of the respective server request sub-sequences corresponding to the particular template include no more than one request.

14. The non-transitory computer-readable medium of claim 12, wherein the sequence of server requests comprise a sequence of server requests sent to a database server within a particular time interval.

15. The non-transitory computer-readable medium of claim 12, wherein determining template patterns comprises:
determining a model based on a sub-sequence of the sequence of templates, the model including a plurality of probability values, wherein each probability value is associated with a particular template of the sequence of templates, and each probability value indicates a probability with which an associated template follows a respective leading sequence of templates.

16. The non-transitory computer-readable medium of claim 15, wherein the sub-sequence of the sequence of templates is the entire sequence of templates.

17. The non-transitory computer-readable medium of claim 15, wherein each template of the sub-sequence of the sequence of templates corresponds to a respective server request sequence included in a file associated with a particular file group.

18. The non-transitory computer-readable medium of claim 15, wherein determining template patterns further comprises:
based on a particular probability value associated with a particular template, adding the particular template to a template pattern.

19. The non-transitory computer-readable medium of claim 15, wherein determining template patterns further comprises:
based on a particular probability value associated with a particular template, beginning a new template pattern that includes the particular template 20. The non-transitory computer-readable medium of claim 15, wherein each of the respective leading sequences of templates include at most a particular number of templates and the particular number is less than or equal to the order of the model.

21. The non-transitory computer-readable medium of claim 20, wherein the instructions which, when executed by the one or more processor, cause:
selecting the order of the model based on a plurality of test models, each test model modeling the sub-sequence of the sequence of templates and each test model being of a different order.

22. The non-transitory computer-readable medium of claim 20, wherein the instructions which, when executed by the one or more processor, cause:
assigning one or more template patterns of the determined template patterns to a particular pattern cluster, wherein each template pattern assigned to the particular pattern cluster is determined to be sufficiently similar to another respective template pattern assigned to the particular pattern cluster.

\* \* \* \* \*

UNITED STATES PATENT AND TRADEMARK OFFICE
CERTIFICATE OF CORRECTION

PATENT NO. : 8,782,219 B2
APPLICATION NO. : 13/475514
DATED : July 15, 2014
INVENTOR(S) : Morfonios et al.

Page 1 of 1

It is certified that error appears in the above-identified patent and that said Letters Patent is hereby corrected as shown below:

On title page 2, column 2, item (56) under Other Publications, line 1, delete "www2." and insert -- www. --, therefor.

On title page 2, column 2, item (56) under Other Publications, line 30, delete "Relay"" and insert -- Replay" --, therefor.

In the Specification

In column 3, line 29, delete "$R_4$ R" and insert -- $R_4$ $R_5$ --, therefor.

Signed and Sealed this
Twenty-fourth Day of February, 2015

Michelle K. Lee
*Deputy Director of the United States Patent and Trademark Office*